US012252293B2

(12) United States Patent
Swope et al.

(10) Patent No.: US 12,252,293 B2
(45) Date of Patent: Mar. 18, 2025

(54) ADHESIVE LABEL APPLICATION SYSTEM FOR A ROBOTIC DEVICE

(71) Applicant: ZEBRA TECHNOLOGIES CORPORATION, Lincolnshire, IL (US)

(72) Inventors: Charles Burton Swope, Coral Springs, FL (US); Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/209,102

(22) Filed: Mar. 22, 2021

(65) Prior Publication Data

US 2022/0297869 A1 Sep. 22, 2022

(51) Int. Cl.
*B65C 9/22* (2006.01)
*B65C 9/00* (2006.01)
*B65C 9/46* (2006.01)

(52) U.S. Cl.
CPC .............. *B65C 9/2234* (2013.01); *B65C 9/46* (2013.01); *B65C 2009/0071* (2013.01)

(58) Field of Classification Search
CPC . B65C 9/2234; B65C 9/46; B65C 2009/0071; B65C 9/40; B65C 9/2239; B65C 9/2243; B65C 9/2213; B65C 9/2226; B65C 9/22; B65C 9/2282; B65C 9/42; B65C 2009/402; B65C 2009/404
See application file for complete search history.

(56) References Cited

U.S. PATENT DOCUMENTS 5,624,520 A * 4/1997 Nedblake .............. B65C 9/1803 156/289
2005/0266198 A1* 12/2005 Downs ....................... C09J 7/10 428/42.3
2018/0186492 A1* 7/2018 Kronseder ............ B65C 9/2265
2020/0031513 A1* 1/2020 Beach ....................... B65C 9/40

FOREIGN PATENT DOCUMENTS

WO WO-2019160826 A1 * 8/2019 ........... B32B 15/043

* cited by examiner

*Primary Examiner* — George R Koch

(57) ABSTRACT

An adhesive label application system is disclosed. The adhesive label application system may detect that a label has been received within an adhesive application zone of a robotic device. The adhesive label application system may remove, via a first mechanism, a portion of the label from the adhesive application zone. The adhesive label application system may convey, via a second mechanism, an adhesive, of an adhesive-carrying tape, to the adhesive application zone. The adhesive label application system may position, via the first mechanism, the portion of the label within the adhesive application zone after the adhesive is positioned within the adhesive application zone. The adhesive label application system may press, via a third mechanism, the portion of the label to the adhesive to apply the adhesive to the label. The adhesive label application system may configure the label to be adhered to a receiving surface via the adhesive.

20 Claims, 5 Drawing Sheets

ADHESIVE LABEL APPLICATION SYSTEM FOR A ROBOTIC DEVICE

BACKGROUND

An environment in which inventories of objects are managed, such as products for purchase in a retail environment or wholesale environment, may be complex and fluid. Such an environment may include a retail facility, a warehouse facility, and/or a transportation environment, among other examples. Organizations that manage the environment may maintain a wide variety of products disposed on support structures (e.g., shelves or other types of platforms), which bear labels containing product information (e.g., prices, barcodes, and/or identification information). The modification of products within the retail facility, the selection of products on the shelves, and/or the formatting of the labels, may change over time. Such changes require previous labels to be replaced with new labels. Therefore, there is a need to generate and/or create labels that can be used to replace old labels.

SUMMARY

In some implementations, a method for applying an adhesive to a label includes detecting that the label has been received within an adhesive application zone of the robotic device; removing, via a first mechanism, a portion of the label from the adhesive application zone; conveying, via a second mechanism, an adhesive, of an adhesive-carrying tape, to the adhesive application zone; positioning, via the first mechanism, the portion of the label within the adhesive application zone after the adhesive is positioned within the adhesive application zone; pressing, via a third mechanism, the portion of the label to the adhesive to apply the adhesive to the label; and configuring the label to be adhered to a receiving surface via the adhesive.

In some implementations, a controller of a robotic device includes one or more memories; and one or more processors, communicatively coupled to the one or more memories, configured to: detect that a label has been output from a printing device of the robotic device; cause a first mechanism to grasp the label; cause a second mechanism to move an adhesive, of an adhesive-carrying tape, into an adhesive application zone; cause the first mechanism to position the label within the adhesive application zone; cause a third mechanism to apply pressure between the label and adhesive to adhere the adhesive to the label; and cause the first mechanism to remove the label from the adhesive application zone to transfer the adhesive to the label in order to form an adhesive label.

In some implementations, a robotic device includes a printing device; a grasping instrument; a positioning instrument mechanically coupled to the grasping instrument; a conveyor instrument; a stamping instrument; and a controller configured to: detect that the printing device printed a label; cause the grasping instrument to grasp the label; cause the conveyor instrument to convey an adhesive on an adhesive-carrying tape to an adhesive application zone; cause the positioning instrument to position the label within the adhesive application zone after the adhesive is positioned within the adhesive application zone; cause the stamping instrument to press the label to the adhesive to form an adhesive label from the label and the adhesive; and cause the positioning instrument to configure the adhesive label for application to a receiving surface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
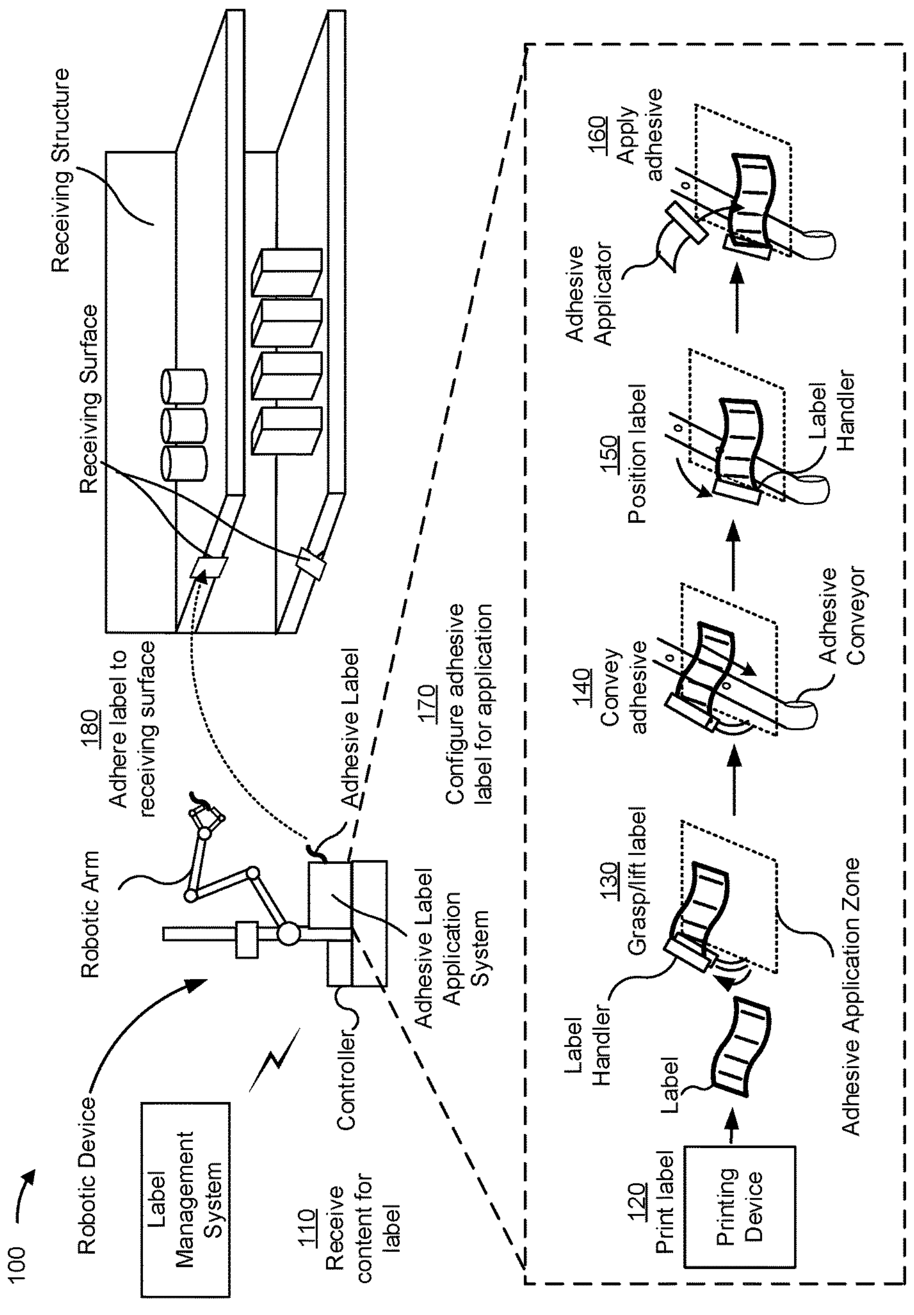
FIG. 1 is a diagram of an example implementation associated with an adhesive label application system for a robotic device, as described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

In some instances, an adhesive is attached to a material (e.g., paper, plastic, metal, or another type of material) to permit the material to be attached to another object (e.g., a receiving structure) or to permit the material to hold or support another object via the adhesive. For example, in a retail or other similar environment, an adhesive may be attached to a label to permit the label to be disposed on a receiving structure, such as a shelf holding a product. In such a case, the label may include and/or indicate product information associated with the product. In some cases, a new label (e.g., a replacement label for the product or the shelf) is to be printed and/or created on or within a mobile (and/or navigable) device (e.g., an autonomous robotic device and/or a semi-autonomous robotic device) that is configured to replace and/or overlay an existing label associated with the product (e.g., to indicate a price change for the product, a new identifier of the product, that a different product is on the shelf, etc.). Accordingly, there is a need for an adhesive to be applied to a printed label within a mobile device to form an adhesive label.

Some implementations described herein provide a robotic device that is configured to apply an adhesive to a printed label to permit the robotic device to apply the printed label to a receiving structure. The adhesive may include a pressure-sensitive hot melt adhesive (e.g., GLUE DOTS® or another similar adhesive) that is maintained on an adhesive-carrying tape installed on the robotic device (e.g., on a conveyor of the robotic device, as described herein). The robotic device may include multiple mechanisms for handling a label (e.g., a newly printed label from a printing device of the robotic device), positioning the adhesive to be applied to the label (e.g., transferred from the adhesive-carrying tape to the label), pressing the label to the adhesive to apply the adhesive to the label and form an adhesive label, and configuring the adhesive label for application on a receiving structure.

In this way, the robotic device can permit on-demand and/or dynamic labelling for a receiving structure by enabling local creation of a label on the robotic device and/or automated application of an adhesive to the label to permit the label to be adhered to a receiving structure. In some instances, the robotic device may be configured to print and/or form an adhesive label when the robotic device is within a threshold distance of the receiving structure (e.g., in a same facility, in a same area of a facility, and/or within a distance defined by a length of a robotic arm of the robotic device). Accordingly, the robotic device may conserve computing resources (e.g. processor resources and/or memory resources) and/or power resources (e.g., battery power and/or fuel) that would otherwise be required to travel or navigate to a stationary printer and/or a stationary machine device that is configured to apply an adhesive to a label to obtain an adhesive label for the receiving structure.

FIG. 1 is a diagram of an example implementation 100 associated with an adhesive label application system for a robotic device. As shown in FIG. 1, example implementation 100 includes a robotic device, a label management system, and a receiving structure that includes one or more receiving surfaces. The receiving structure may be positioned within an environment associated with an entity (e.g., an individual or organization) that stores, manages, rents, and/or sells goods or products that are to be identified by content on labels. As described herein, the robotic device may use a printing device to print content to a content side of a label (e.g., based on content information received from the label management platform). These devices are described in more detail below in connection with FIG. 3.

In FIG. 1, the robotic device includes a controller, an adhesive label application system, and a robotic arm. The controller may include one or more devices (e.g., memories, processors, and/or the like) that are configured to control the robotic arm and/or the robotic device in association with applying an adhesive label to the receiving surface (e.g., to add the adhesive label to the receiving surface and/or to replace or overlay another label on the receiving surface). The robotic device includes one or more components or mechanisms to move one or more devices of the robotic device.

As shown in FIG. 1, and by reference number 110, the robotic device may receive content for a label. For example, the robotic device may receive the content within label information (e.g., as a printer input for a printing device) from the label management system (e.g., based on product being added or included on the shelf and/or based on a change to a product on a shelf associated with the receiving surface).

In some implementations, based on receiving the label information, the robotic device may navigate to the receiving surface and/or position the robotic device at a location that permits the robotic device to apply an adhesive label to the receiving surface. The robotic device may move into position based on position information (e.g., aisle, shelf, and/or bin information) and/or instructions from the label management platform within the label information. Accordingly, based on processing the label information and/or identifying an aisle, shelf, and/or bin location of the label, the controller may maneuver the robotic device into a position that permits the robotic arm to access the receiving surface.

As further shown in FIG. 1, and by reference number 120, the robotic device may print the label. For example, based on receiving the label information, the controller may cause the printing device to print content to the label. The printing device may be configured and/or positioned to output or provide the label (with the printed content) to an adhesive application zone of the robotic device. The adhesive application zone may correspond to an output tray (e.g., a surface or platform to which labels are fed from the printing device).

As further shown in FIG. 1, and by reference number 130, the robotic device may grasp and/or lift the label. For example, the controller may cause a label handler (e.g., with a grasping instrument in an open position) to grasp the label (e.g., by causing the grasping instrument to transition to a closed position) to permit the label handler to move and/or position the label. The controller may cause the label handler to grasp the label based on the label being received into the adhesive application zone. The controller may detect that the label was received in the adhesive application zone based on an indication from a sensor of the robotic device (e.g., a motion sensor or another type of sensor that is capable of detecting the presence of the label). The sensor may be configured to monitor the adhesive application zone and/or a printing output (e.g., a label ejector) of the printing device. Additionally, or alternatively, the controller may detect that the label was received (or is going to be received) within the adhesive application zone based on an output of the printing device and/or based on monitoring the printing of the label by the printing device (e.g., using sensors and/or information from the printing device). In some implementations, the label is positioned within the adhesive application zone using one or more guides and/or barriers of the adhesive application zone (e.g., mechanical stoppers or guides at one or more edges of the adhesive application zone).

In some implementations, after grasping the label, the controller may cause the label handler to move the label into a position that permits the adhesive to be received within the adhesive application zone without interference from the label (e.g., based on the label obstructing a path of an adhesive-carrying tape that is supplied with the adhesive). For example, the controller may cause a positioning instrument of the label handler to remove the label from the adhesive application zone by lifting the grasping instrument. The positioning instrument may remove the label by lifting the grasping instrument. For example, the positioning instrument may rotate a lifting arm (e.g., using a servo motor or other type of electric motor) by rotating a lifting arm of the positioning instrument to a particular angle relative to a surface of the adhesive application zone (e.g., a 15 degree angle or other angle within a threshold range that removes the label from the adhesive application zone so that the label does not interfere with an adhesive-carrying tape that includes an adhesive to be applied to the label).

In some implementations, based on grasping the label toward an end (or edge) of the label, the label handler may remove a portion of the label from the adhesive application zone (e.g., a portion toward the end of the label that was grasped and/or a portion under which the adhesive is to be conveyed into the adhesive application zone). As shown, the label handler may grasp the label at an end that is toward the printing device to permit the adhesive application zone to be supplied with an adhesive on an adhesive-carrying tape in an area of the adhesive application zone that is toward the printing device.

As further shown in FIG. 1, and by reference number 140, the robotic device may convey an adhesive into the adhesive application zone. For example, the controller may cause an adhesive conveyor to move the adhesive into the adhesive application zone based on the label being removed from the adhesive application zone. The adhesive conveyor may include a conveyor instrument that is supplied with and/or configured to control movement of an adhesive-carrying tape supplied with adhesive. In some implementations, the adhesive-carrying tape may be arranged in a roll and supplied (and/or installed) on and/or connected to a roller of the adhesive conveyor (e.g., a motorized roller and/or a roller mechanically coupled to a motorized roller via the adhesive-carrying tape). Accordingly, movement of the conveyor instrument may cause the adhesive-carrying tape to be conveyed (e.g., pulled or pushed) across (or through) the adhesive application zone, thereby correspondingly moving the adhesive into the adhesive application zone. The controller may cause the adhesive conveyor to convey the adhesive-carrying tape through the adhesive application zone until the adhesive is within the adhesive application zone (e.g., within a perimeter of the adhesive application zone that corresponds to a perimeter of an output tray of the printing device or another similar area).

The adhesive is attached to the adhesive-carrying tape as individual units. For example, the adhesive may include one or more adhesive units of a pressure-sensitive hot melt adhesive (e.g., one or more GLUE DOTS® or other similar adhesives). In some implementations, the robotic device conveys a fixed length (e.g., a length that is based on a distance between one or more adhesive units that are longitudinally aligned along the adhesive-carrying tape) of the adhesive-carrying tape through the adhesive application zone to move the adhesive into the adhesive application zone. Additionally, or alternatively, the length of the adhesive-carrying tape that the controller moves through the adhesive application zone may be based on a size of the label and/or an arrangement of the adhesive units on the adhesive-carrying tape. For example, more adhesive units may be adhered to relatively larger labels (e.g., to permit the larger label to receive stronger adhesive properties) than to relatively smaller labels (e.g., which do not require as strong of adhesive properties as the larger label, thereby permitting the robotic device to conserve adhesive units and/or resources of the robotic device that would otherwise be wasted by applying unnecessary adhesive units to the label). The controller may use a sensor to verify that a desired amount of adhesive (e.g., a desired quantity of adhesive units) are in the adhesive application zone before causing the adhesive conveyor to stop conveying the adhesive-carrying tape through the adhesive application zone.

As further shown in FIG. 1, and by reference number 150, the robotic device may position the label to apply the adhesive to the label. For example, the controller may cause the label handler to position the label within the adhesive application zone to align the label with the adhesive (e.g., based on the adhesive being positioned within the adhesive application zone). More specifically, the controller may cause the positioning instrument of the label handler to return the label to be positioned over the adhesive after the adhesive is moved into the adhesive application zone. In some implementations, the positioning instrument may rotate the lifting arm back to a default position (e.g., so that the label is parallel to the surface of the adhesive application zone) and/or to a position that is beyond the lift angle (e.g., if the lift arm is lifted to a 15 degree angle, the lift arm may be dropped 20 degrees from that angle to ensure that the label is against the adhesive).

As further shown in FIG. 1, and by reference number 160, the robotic device may apply the adhesive. For example, as shown, the controller may cause an adhesive applicator to press the label against the adhesive (e.g., to apply pressure between the label and the adhesive) based on the label being positioned over the adhesive (e.g., based on the positioning instrument dropping the lift art as described above). The adhesive applicator may include a stamping instrument that presses on (e.g., applies pressure toward) a content side of the label while the adhesive is on the adhesive-carrying tape within the adhesive application zone. Accordingly, by pressing the label onto the adhesive so that the adhesive is in contact with a backside of the label (e.g., a side that is opposite the content side and/or that is to be attached to the receiving surface, as described herein), the adhesive applicator may cause the adhesive to adhere and/or attach to the label. In some implementations, the stamping instrument may iteratively press the label against the adhesive (e.g., by pressing the stamping mechanism multiple times against the adhesive) to apply the adhesive to the label.

In some implementations, the adhesive applicator may be mounted on or within the robotic device toward the printing device (e.g., on a side of the adhesive application zone that is toward, adjacent, or nearest the printing device). In this way, the adhesive application may apply pressure on a portion of the label that is toward the printing device and/or that was previously lifted from the adhesive application zone to permit the adhesive application zone to be supplied with the adhesive.

As further shown in FIG. 1, and by reference number 170, the robotic device may configure the adhesive label for application. For example, the controller may cause the label handler to release the pressure from the label (e.g., from the portion of the label that is over the adhesive). The controller may cause the label handler to separate the label away from the adhesive-carrying tape to cause the label to separate from the adhesive-carrying tape with the adhesive bound to the backside of the label. For example, the positioning instrument of the label handler may be configured in a manner to peel the label from the adhesive-carrying tape and/or the adhesive application zone. More specifically, the positioning instrument may pivot or rotate in a manner that allows for more pulling force from one side of the adhesive (e.g., a side that is toward the printing device) than the other (e.g., the side of the adhesive that is away from the printing device).

In this way, the robotic device may form an adhesive label from a combination of the label and the adhesive. In some implementations, the robotic device may configure the adhesive label for application by causing the positioning instrument to move (e.g., lift) the adhesive label into a position that is accessible to the robotic arm and to permit the robotic arm to apply the adhesive label to the receiving surface. In some implementations, after the adhesive is applied to the label (e.g., after the label is peeled from the adhesive-carrying tape to form the adhesive label), the controller may cause the label handler to return to a default position to receive another label that is to receive other units of the adhesive from the adhesive-carrying tape, as described herein.

As further shown in FIG. 1, and by reference number 180, the robotic device may adhere the label to the receiving surface. For example, the controller may cause the robotic arm to grasp the adhesive label (e.g., from the label handler) and/or cause the grasping instrument of the label handler to release the label. The controller may use a camera (or another type of sensor) to determine or identify the location of the receiving surface using any suitable technique, such as image processing, using reference markers, and/or the like. The controller may cause the robotic arm to maneuver the label toward (and/or reposition the label over) the location of the receiving surface and cause the robotic arm to press the adhesive label to the receiving surface to adhere the adhesive label to the receiving surface.

In this way, the robotic device may be configured to locally create an adhesive label that can be formed from a locally printed label and an adhesive. Therefore, the robotic device may include an adhesive label application system that permits the adhesive to applied to locally printed labels and conserves resources that would have otherwise been consumed retrieving a printed label and/or an adhesive label from a stationary printer and/or a machine that supplies adhesive labels.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
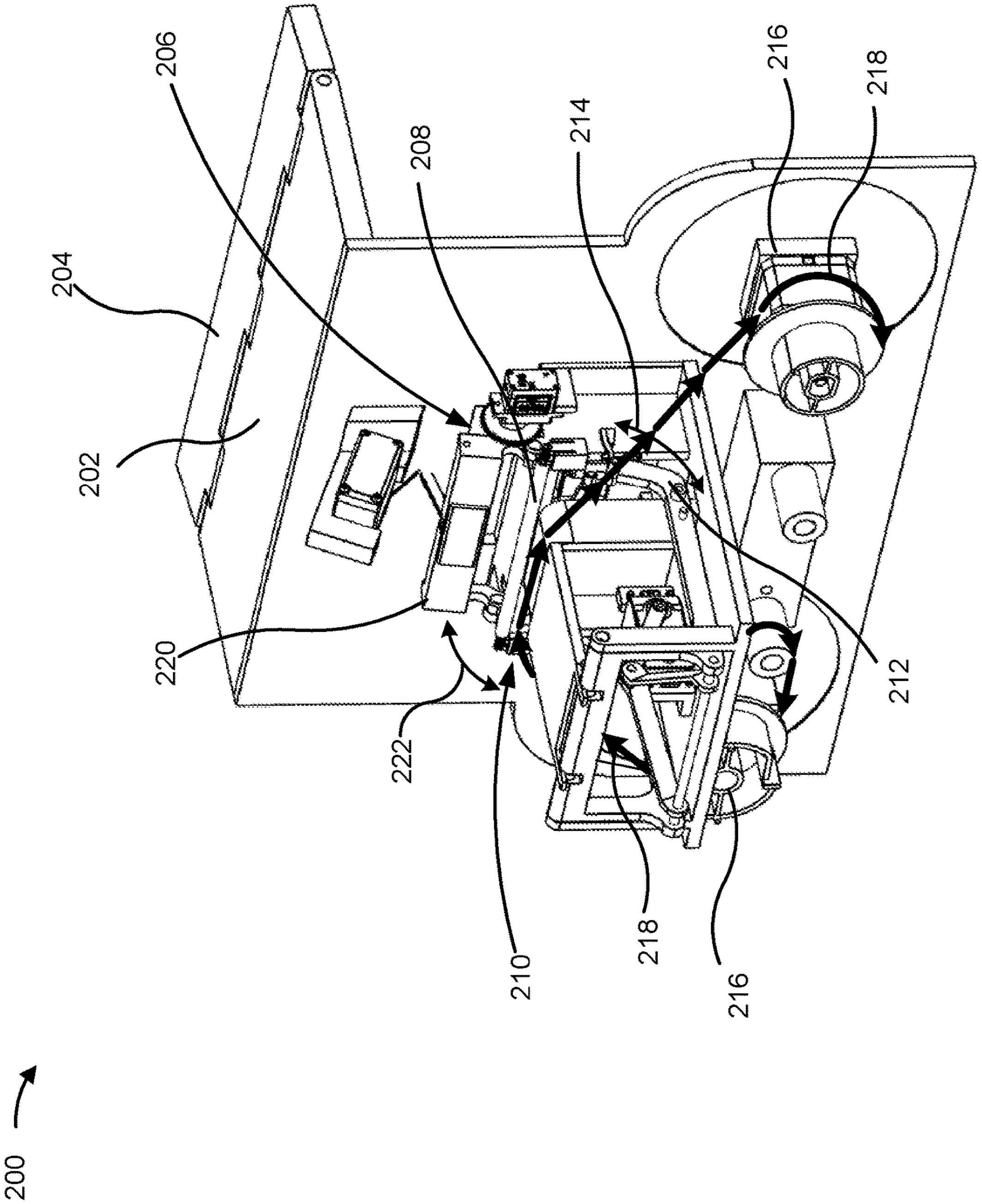
FIG. 2 is a diagram of an example implementation of an arrangement of an adhesive label application system for a robotic device, as described herein.

FIG. 2 is a diagram of an example implementation of an arrangement 200 of an adhesive label application system for a robotic device (e.g., the adhesive label application system of FIG. 1). As shown in FIG. 2, the arrangement 200 includes a supporting frame 202 that is attached to a printing device mount 204 associated with a printing device. A printer opening 206 may be aligned with an output of a printing device associated with the printing device mount 204.

The arrangement 200 includes a grasping instrument 208 (e.g., the grasping instrument of a label handler described elsewhere herein). The grasping instrument 208 may be configured to grasp a label as the label is printed and/or after the label is printed and provided to an adhesive application zone 210 (e.g., an adhesive application zone described elsewhere herein) of the arrangement 200. The grasping instrument 208 may be communicatively coupled to a positioning instrument 212 (e.g., the positioning instrument of the label handler described elsewhere herein) that is configured to move (as shown by reference arrows 214) the grasping instrument 208 (and correspondingly a label grasped by the grasping instrument 208).

The arrangement 200 includes one or more conveyor instruments 216. The conveyor instrument 216 is configured to cause an adhesive-carrying tape installed on the conveyor instrument 216 to move as shown by reference arrows 218). The conveyor instrument 216, as shown, when outfitted with an adhesive-carrying tape supplied with an adhesive, may move the adhesive across or through the adhesive application zone 210, as described elsewhere herein.

The arrangement 200 includes a stamping instrument 220 (e.g., a stamping instrument of an adhesive applicator described elsewhere herein). The stamping instrument 220 is configured to move (as shown by reference arrows 222) to apply pressure to a label and/or an adhesive and/or release pressure from the label and/or adhesive to permit an adhesive label to be formed.

In some implementations, after the stamping instrument 220 applies pressure to the label and the adhesive, the positioning instrument may move (e.g., toward the upward arrow) to peel the adhesive from an adhesive-carrying tape that supplied the adhesive to the adhesive application zone 210.

Accordingly, the arrangement 200 may be configured within a robotic device (e.g., in combination with a printing device) to create an adhesive label (e.g., formed by a combination of the label and the adhesive). In this way, the adhesive label application system is configured to effectively adhere the adhesive to the label within a relatively condensed space (e.g., within a robot that is small enough to fit between aisles of a retail facility, warehouse facility, or the like).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
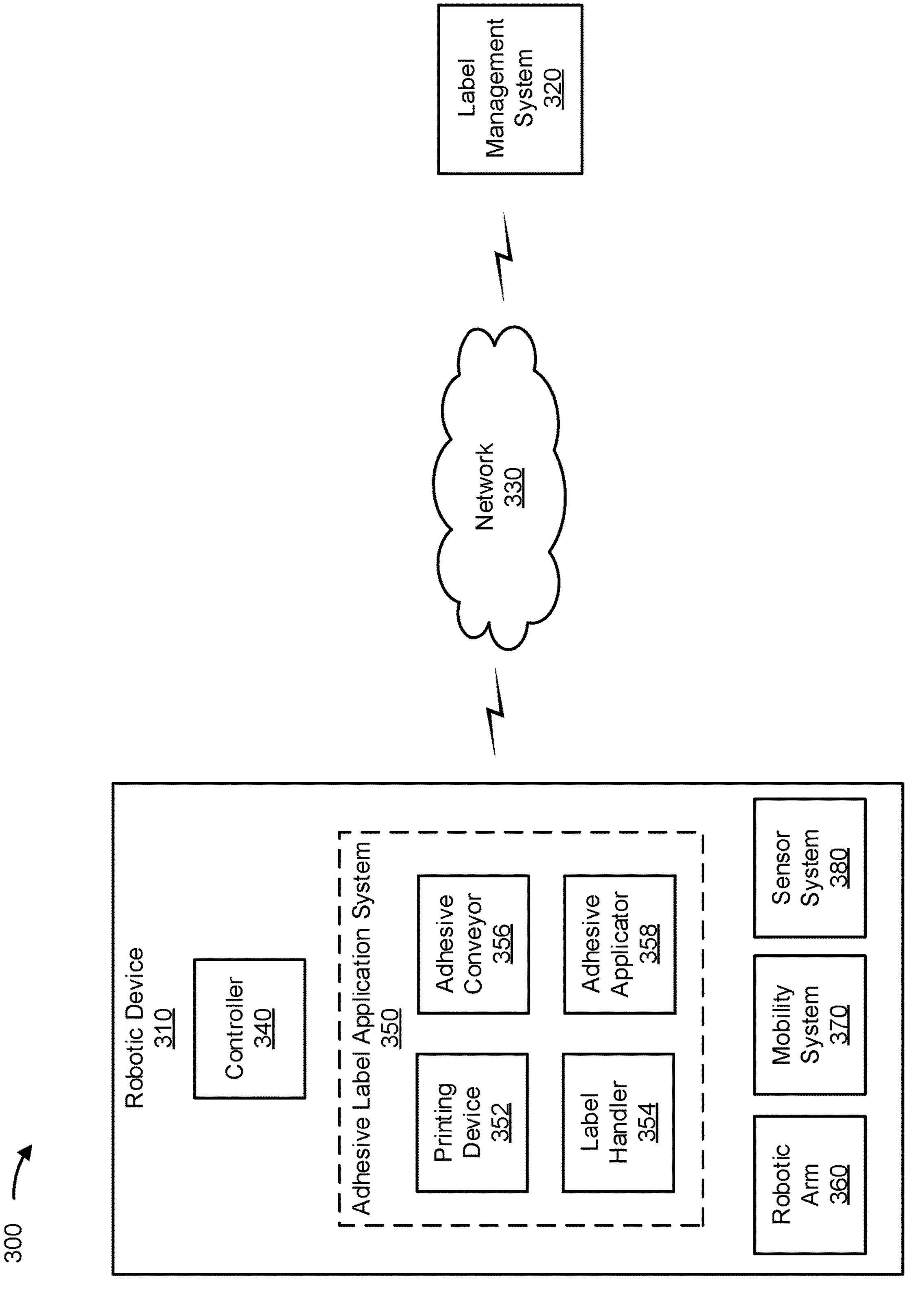
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a robotic device 310, a label management system 320, and a network 330. The robotic device 310 includes a controller 340 and an adhesive label application system 350, which includes a printing device 352, a label handler 354, an adhesive conveyor 356, and an adhesive applicator 358. In FIG. 3, the robotic device 310 includes a robotic arm 360, a mobility system 370, and a sensor system 380. Devices of environment 300 may interconnect via wired connections, wireless connections, or a combination of wired and wireless connections.

The robotic device 310 includes one or more devices and/or mechanisms for creating and/or applying an adhesive label to a receiving structure. The controller 340 may include one or more devices (e.g., one or more processors, one or more memories, and/or the like) that are capable of controlling one or more components of the robotic device 310, as described elsewhere herein. Accordingly, the controller 340 may include and/or control the adhesive label application system 350 (e.g., to create an adhesive label), the robotic arm 360 (e.g., to apply the adhesive label to a receiving structure), and/or the mobility system 370 (e.g., to maneuver the robotic device 310 to a location of the receiving structure), as described herein.

The printing device 352 may include any suitable type of printer for printing a label, as described herein. For example, the printing device may include a laser printer and/or an inkjet printer, among other examples. The label handler 354 may include one or more mechanisms (e.g., one or more motorized mechanisms and/or one or more hydraulic mechanisms) for handling (e.g., holding and/or positioning) a label. For example, the label handler 354 may include the grasping instrument and/or positioning instrument described in connection with FIGS. 1 and 2. The adhesive conveyor 356 may include one or more mechanisms for conveying an adhesive-carrying tape to position an adhesive for application to a label as described herein. The adhesive applicator 358 may include one or more mechanisms for applying an adhesive to a label to form an adhesive label, as described herein.

The robotic arm 360 includes one or more mechanisms for obtaining and/or transferring the adhesive label to a receiving structure, as described herein. The mobility system 370 includes one or more devices, components, and/or mechanisms for physically maneuvering the robotic device 310 to a location (e.g., a location of the receiving structure) and/or into a particular position (e.g., a position that permits the robotic arm 360 to reach the receiving structure and/or apply the adhesive label to the receiving structure). The sensor system 380 includes one or more sensors that provide sensor data to the controller 340 to permit the controller 340 to control the robotic device 310 according to the sensor data. For example, the sensor system 380 may include a camera, a location sensor (e.g., a global positioning system (GPS) receiver, a local positioning system (LPS) device (e.g., that uses triangulation, multi-lateration, etc.), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

The label management system 320, includes one or more devices capable of receiving, generating, storing, processing, and/or providing information associated with an adhesive label that permits the robotic device to form the adhesive label and/or apply the adhesive label to a receiving structure, as described elsewhere herein. The label management system 320 may include a communication device and/or a computing device. For example, the label management system 320 may include a server, such as an application server, a client server, a web server, a database server, a host server, a proxy server, a virtual server (e.g., executing on computing hardware), or a server in a cloud computing system. In some implementations, the label management system 320 includes computing hardware used in a cloud computing environment.

The network 330 includes one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
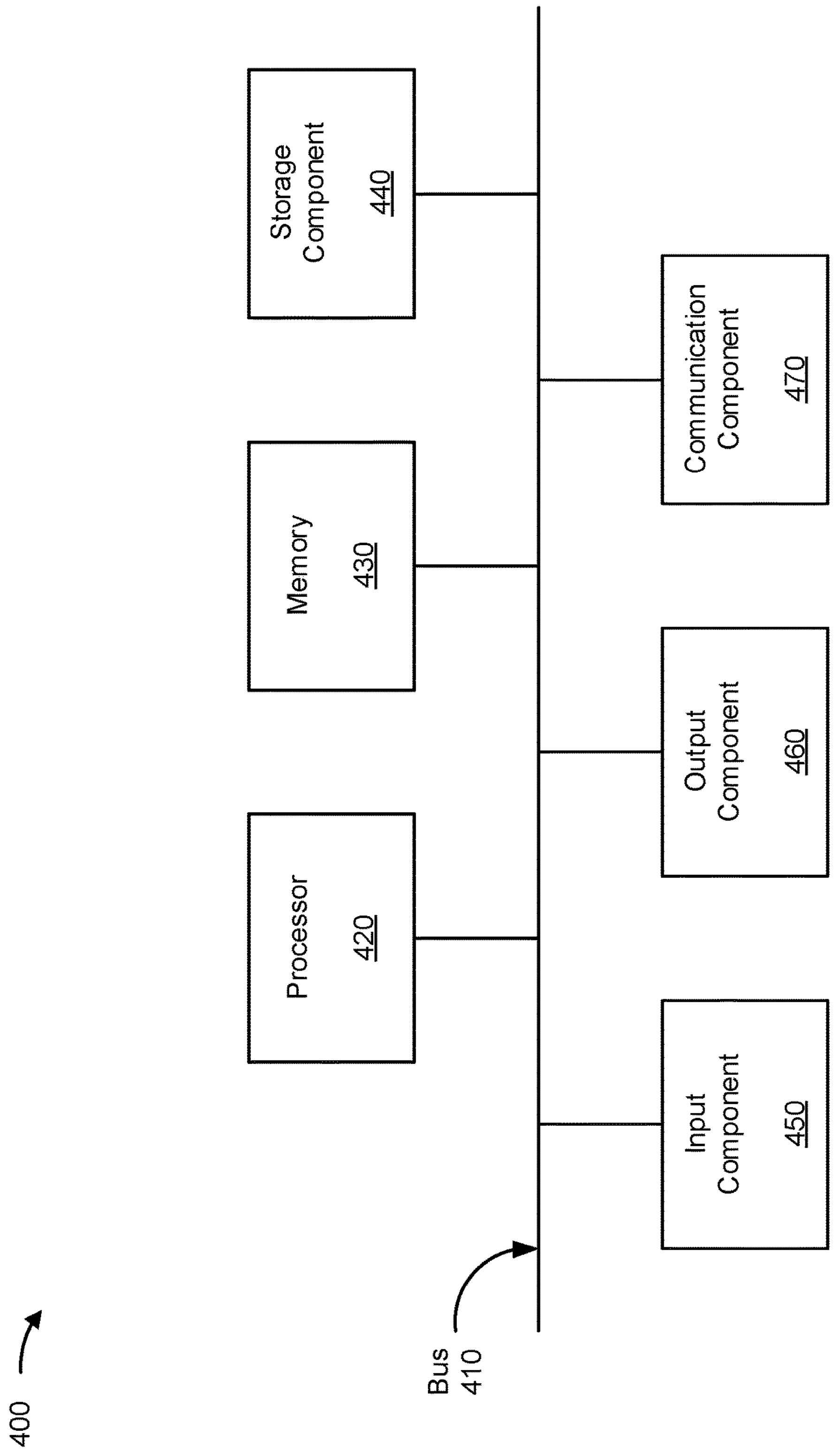
FIG. 4 is a diagram of example components of one or more devices of FIGS. 1-3.

FIG. 4 is a diagram of example components of a device 400, which may correspond to the robotic device 310 and/or the label management system 320. In some implementations, the robotic device 310 and/or the label management system 320 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
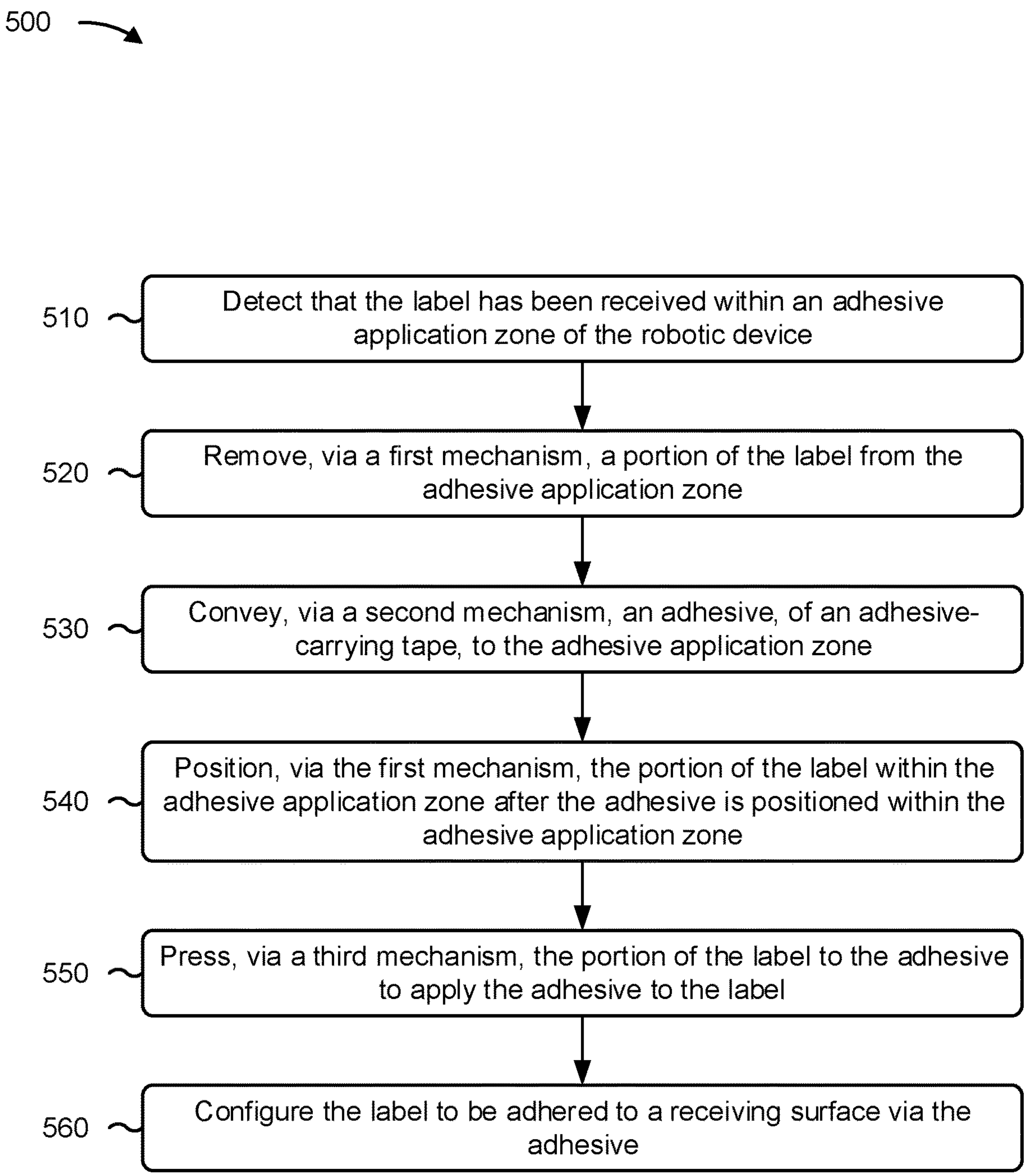
FIG. 5 is a flowchart of an example process relating to an adhesive label application system for a robotic device.

FIG. 5 is a flowchart of an example process 500 associated with an adhesive label application system for a robotic device. In some implementations, one or more process blocks of FIG. 5 may be performed by a robotic device (e.g., robotic device 310). In some implementations, one or more process blocks of FIG. 5 may be performed by another device or a group of devices separate from or including the robotic device, such as a label management system (e.g., the label management system 320). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include detecting that the label has been received within an adhesive application zone of the robotic device (block 510). For example, the robotic device may detect that the label has been received within an adhesive application zone of the robotic device, as described above.

In some implementations, detecting that the label has been received within the adhesive application zone may include receiving an indication from a sensor that the label is within the adhesive application zone and/or receiving an indication from a printing device that the printing device provided the label to the adhesive application zone. Prior to detecting that the label has been received, the robotic device may print the label via a printing device of the robotic device. The printing device may be configured to provide the label to the adhesive application zone.

As further shown in FIG. 5, process 500 may include removing, via a first mechanism, a portion of the label from the adhesive application zone (block 520). For example, the robotic device may remove, via a first mechanism, a portion of the label from the adhesive application zone, as described above. The first mechanism may correspond to a label hander (e.g., a grasping instrument and/or a positioning instrument) described elsewhere herein.

In some implementations, removing the label from the adhesive application zone may include the robotic device causing, based on detecting that the label is in the adhesive application zone, a grasping instrument of the first mechanism to grasp the label within the adhesive application zone and/or causing a positioning instrument of the first mechanism to lift the grasping instrument from the adhesive application zone.

As further shown in FIG. 5, process 500 may include conveying, via a second mechanism, an adhesive, of an adhesive-carrying tape, to the adhesive application zone (block 530). For example, the robotic device may convey, via a second mechanism, an adhesive, of an adhesive-carrying tape, to the adhesive application zone, as described above. The second mechanism may correspond to an adhesive conveyor, including a conveyor instrument and/or corresponding motorized mechanisms, described elsewhere herein.

In some implementations, conveying the adhesive to the adhesive application zone may include the robotic device causing a conveyor instrument of the second mechanism to move the adhesive-carrying tape across the adhesive application zone until the adhesive is within the adhesive application zone.

As further shown in FIG. 5, process 500 may include positioning, via the first mechanism, the portion of the label within the adhesive application zone after the adhesive is positioned within the adhesive application zone (block 540). For example, the robotic device may position, via the first mechanism, the portion of the label within the adhesive application zone after the adhesive is positioned within the adhesive application zone, as described above.

As further shown in FIG. 5, process 500 may include pressing, via a third mechanism, the portion of the label to the adhesive to apply the adhesive to the label (block 550). For example, the robotic device may press, via a third mechanism, the portion of the label to the adhesive to apply the adhesive to the label, as described above. The third mechanism may include an adhesive applicator, including a stamping instrument and/or corresponding motorized mechanisms, described elsewhere herein.

In some implementations, pressing the portion of the label toward the adhesive may include the robotic device causing a stamping instrument of the third mechanism to apply pressure, on a content side of the label, toward the adhesive. The stamping instrument applies the pressure while the adhesive is on the adhesive-carrying tape. The adhesive may be on a backside of the label that is opposite the content side.

As further shown in FIG. 5, process 500 may include configuring the label to be adhered to a receiving surface via the adhesive (block 560). For example, the robotic device may configure the label to be adhered to a receiving surface via the adhesive, as described above. In some implementations, the robotic device may configure the label to be adhered to the receiving surface by positioning the label (e.g., via the first instrument) at a location that is accessible to a robotic arm of the robotic device to permit the robotic arm to adhere the label to the receiving surface.

In some implementations, configuring the label to be applied to the receiving surface includes the robotic device releasing pressure, applied by the third mechanism, from the portion of the label, and separating, via the first mechanism, the label away from the adhesive-carrying tape to cause the label to release the adhesive from the adhesive-carrying tape. After the label causes the adhesive to be released from the adhesive-carrying tape, an adhesive label may be formed by a combination of the label and the adhesive.

In some implementations, the robotic device may grasp, via a fourth mechanism, the adhesive label and determine, using a camera of the robotic device, a location of the receiving surface. The robotic device may maneuver, via the fourth mechanism, the adhesive label toward the location of the receiving surface and press, via the fourth mechanism, the adhesive label to the receiving surface. The fourth mechanism may correspond to a robotic arm described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" and/or "mechanism" is/or intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for applying an adhesive to a label, comprising:

detecting, by a robotic device, that the label has been received within an adhesive application zone of the robotic device;

removing, by the robotic device and via a first mechanism, a portion of the label from the adhesive application zone;

conveying, by the robotic device and via a second mechanism, a pressure sensitive adhesive, of an adhesive-carrying tape, to the adhesive application zone;

positioning, by the robotic device and via the first mechanism, the portion of the label within the adhesive application zone after the pressure sensitive adhesive is positioned within the adhesive application zone;

pressing, by the robotic device and via a third mechanism, the portion of the label to the pressure sensitive adhesive to apply the pressure sensitive adhesive to the label; and configuring, by the robotic device, the label to be adhered to a receiving surface via the pressure sensitive adhesive.

2. The method of claim 1, further comprising:

prior to detecting that the label has been received, printing the label via a printing device of the robotic device, wherein the printing device is configured to provide the label to the adhesive application zone.

3. The method of claim 1, wherein detecting that the label has been received within the adhesive application zone comprises at least one of:

receiving an indication from a sensor that the label is within the adhesive application zone; and receiving an indication from a printing device that the printing device provided the label to the adhesive application zone.

4. The method of claim 1, wherein removing the label from the adhesive application zone comprises:

causing, based on detecting that the label is in the adhesive application zone, a grasping instrument of the first mechanism to grasp the label within the adhesive application zone; and causing a positioning instrument of the first mechanism to lift the grasping instrument from the adhesive application zone.

5. The method of claim 1, wherein conveying the pressure sensitive adhesive to the adhesive application zone comprises:

causing a conveyor instrument of the second mechanism to move the adhesive-carrying tape across the adhesive application zone until the pressure sensitive adhesive is within the adhesive application zone.

6. The method of claim 1, wherein pressing the portion of the label toward the pressure sensitive adhesive comprises:

causing a stamping instrument of the third mechanism to apply pressure, on a content side of the label, toward the pressure sensitive adhesive, wherein the stamping instrument applies the pressure while the pressure sensitive adhesive is on the adhesive-carrying tape, and wherein the pressure sensitive adhesive is on a backside of the label that is opposite the content side.

7. The method of claim 1, wherein configuring the label to be applied to the receiving surface comprises:

releasing pressure, applied by the third mechanism, from the portion of the label; and separating, via the first mechanism, the label away from the adhesive-carrying tape to cause the label to release the pressure sensitive adhesive from the adhesive-carrying tape, wherein, after the label causes the pressure sensitive adhesive to be released from the adhesive-carrying tape, an adhesive label is formed by a combination of the label and the pressure sensitive adhesive.

8. The method of claim 7, further comprising:

grasping, via a fourth mechanism, the adhesive label;

determining, using a camera of the robotic device, a location of the receiving surface;

maneuvering, via the fourth mechanism, the adhesive label toward the location of the receiving surface; and pressing, via the fourth mechanism, the adhesive label to the receiving surface.

9. A controller of a robotic device, comprising:

one or more memories; and one or more processors, communicatively coupled to the one or more memories, configured to:

detect that a label has been output from a printing device of the robotic device into an adhesive application zone;

cause a first mechanism to grasp the label;

cause a positioning instrument of the first mechanism to remove the label from the adhesive application zone;

cause a second mechanism to move a pressure sensitive adhesive, of an adhesive-carrying tape, into the adhesive application zone;

cause the first mechanism to position the label within the adhesive application zone;

cause a third mechanism to apply pressure between the label and the pressure sensitive adhesive to adhere the pressure sensitive adhesive to the label; and cause the first mechanism to remove the label from the adhesive application zone to transfer the pressure sensitive adhesive to the label in order to form an adhesive label.

10. The controller of claim 9, wherein the one or more processors are further configured to:

prior to detecting that the label has been output from the printing device, receive a printer input that identifies content for the label; and cause the printing device of the robotic device to print the content on the label.

11. The controller of claim 9, wherein the one or more processors, when detecting that the label has been output from the printing device, are configured to:

receive an indication from a sensor that the label is within the adhesive application zone; and receive an indication from a printing device that the printing device output the label.

12. The controller of claim 9, wherein the one or more processors are configured to:

cause the positioning instrument of the first mechanism to remove the portion of the label from the adhesive application zone to permit the second mechanism to move the pressure sensitive adhesive to the adhesive application zone without interference from the portion of the label.

13. The controller of claim 9, wherein the one or more processors, when causing the second mechanism to move the pressure sensitive adhesive to the adhesive application zone, are configured to:

cause a conveyor instrument of the second mechanism to convey the pressure sensitive adhesive to the adhesive application zone on the adhesive-carrying tape, wherein the third mechanism applies pressure between the label and the pressure sensitive adhesive via a stamping instrument that presses the label toward the pressure sensitive adhesive while the pressure sensitive adhesive is on the adhesive-carrying tape.

14. The controller of claim 9, wherein the one or more processors are further configured to:

cause a robotic arm to obtain the adhesive label from the first mechanism; and cause the robotic arm to transfer the adhesive label to a receiving surface.

15. A robotic device, comprising:
a printing device;
a grasping instrument;
a positioning instrument mechanically coupled to the grasping instrument;
a conveyor instrument;
a stamping instrument; and
a controller configured to:
detect that the printing device printed a label;
determine that the label is within an adhesive application zone;
cause the grasping instrument to grasp the label;
cause the positioning instrument to remove the label from the adhesive application zone;
cause the conveyor instrument to convey a pressure sensitive adhesive on an adhesive-carrying tape to an adhesive application zone;
cause the positioning instrument to position the label within the adhesive application zone after the pressure sensitive adhesive is positioned within the adhesive application zone;
cause the stamping instrument to press the label to the pressure sensitive adhesive to form an adhesive label from the label and the pressure sensitive adhesive; and
cause the positioning instrument to configure the adhesive label for application to a receiving surface.

16. The robotic device of claim 15, wherein the controller, when detecting that the label has been printed, is configured to:
receive an indication from a sensor that the label is within the adhesive application zone,
wherein the sensor is configured to monitor the adhesive application zone or a printing output of the printing device.

17. The robotic device of claim 15, wherein the controller is configured to:
cause the positioning instrument to remove the label from the adhesive application zone to permit the conveyor instrument to move the pressure sensitive adhesive to the adhesive application zone without interference from the label.

18. The robotic device of claim 15, wherein the controller, when causing the conveyor instrument to convey the pressure sensitive adhesive to the adhesive application zone, is configured to:
cause a motorized roller of the conveyor instrument to convey the adhesive-carrying tape through the adhesive application zone until the pressure sensitive adhesive is within a perimeter of the adhesive application zone.

19. The robotic device of claim 15, wherein the robotic device further comprises:
a robotic arm,
wherein the controller is configured to:
cause the robotic arm to obtain the label from the grasping instrument;
cause the robotic arm to maneuver the adhesive label to a location of the receiving surface; and
cause the robotic arm to press the adhesive label to the receiving surface.

20. The robotic device of claim 15, wherein the adhesive application zone is disposed adjacent to a printing output of the printing device.

* * * * *